United States Patent Office 2,786,762
Patented Mar. 26, 1957

2,786,762

ROQUEFORT-TYPE CHEESE AND PROCESSES OF PREPARING THE SAME

Stanley G. Knight, Madison, Wis., assignor to Wisconsin Alumni Research Foundation, Madison, Wis., a corporation of Wisconsin No Drawing. Original application July 25, 1950, Serial No. 175,889, now Patent No. 2,665,990, dated January 12, 1954. Divided and this application March 6, 1953, Serial No. 340,930

6 Claims. (Cl. 99—116)

The present invention relates to the cheese art and more specifically to roquefort-type cheese and improved processes of preparing the same.

The processes employed in the manufacture of roquefort-type or "blue-vein" cheese employing spores of the blue-green mold *Penicillium roqueforti* are well-known in the cheese art. While the prior processes have been employed for quite some time, the use of the mold *Penicillium roqueforti* with cow's milk in the manufacture of roquefort-type cheese has presented serious problems. One of the biggest problems in the roquefort-type or blue-vein cheese industry, for example, has been the failure in a considerable number of instances of the mold to grow or grow properly in the green cheese or curd. The cheese in which the mold does not grow or in which the mold grows poorly does not ripen and is a total loss. Up until the discoveries leading to the present invention, attempts by skilled investigators working in the art to solve the *Penicillium roqueforti* mold growth problem in the roquefort-type cheese industry had proven unsuccessful.

The principal object of the present invention is to provide an improved process for making roquefort-type cheese in which the mold grows very well and the resulting ripened cheese is of the desired high quality.

Other objects of the present invention will be apparent as the description proceeds hereinafter.

I have discovered two methods for enhancing the growth of the mold *Penicillium roqueforti* in the manufacture of roquefort-type cheese. One method calls for the addition of small amounts of iron to the cow's milk used in the manufacture of the cheese. The other method calls for the use of a white mutant obtained by irradiation of the blue-green mold and is described and claimed in my copending application Serial No. 175,889, filed July 25, 1950, now Patent No. 2,665,990.

Method I.—ADDITION OF IRON

I have discovered that the addition of small amounts of iron to cow's milk to be used in the manufacture of roquefort-type cheese will enhance the growth of the blue-green mold and will result in a more uniformly better quality of product. Any substantially non-toxic iron compound may be used including the inorganic and organic iron salts such as ferric chloride, ferrous sulfate, ferric sulfate, ferric acetate, ferric citrate, ferric lactate, etc. In addition, as my investigations show that only minute amounts (about 7 p. p. m.) of iron are necessary, metallic iron itself may be used as sufficient amounts of iron may be solubilized in the presence of the milk to produce the desired mold growth. Ordinarily it is preferred to employ a soluble iron salt and add sufficient salt to provide at least about 0.7 mg. of iron in solution employed if desired, although the use of over about 1.5 mg. of iron per 100 ml. of milk has not been found to have any appreciable beneficial effect on mold growth in roquefort-type cheese.

The following examples will serve to illustrate the growth of the colored mold in the absence of and presence of added iron.

Example 1

Whole cow's milk was placed in clean 100 ml. flasks, stoppered with cotton plugs, and sterilized by autoclaving at about 120° C. for fifteen minutes. Following sterilization sterile dilute aqueous solutions of iron in the form of ferric chloride were added to the flasks in different quantities to provide a range from 0.17 mg. up to 1.38 mg. of iron per 100 ml. of milk. No iron was added to one flask which was maintained as a control.

Each 100 ml. of milk was then inoculated with 1 ml. of a twenty-four hour old cheese starter of the type used in the manufacture of roquefort-type or blue vein cheese. The starter was added in order to make the conditions of mold growth more comparable to roquefort-type cheese manufacture. The milk was then inoculated with about ½ ml. of a heavy suspension of spores in sterile distilled water, the spores used being from a culture of *Penicillium roqueforti* propagated on vegetable juice-agar in a culture tube. After inoculation the flasks were incubated at 25° C. and observed daily for growth and sporulation.

The green or bluish-green *Penicillium roqueforti* mold was found to grow rapidly and sporulate heavily in the flasks containing at least about 7 p. p. m. or more of iron in solution. In the flasks containing less iron or the control flask containing no iron, growth was slow and both growth and sporulation were light.

Example 2

The procedure employed in this example is similar to the procedure employed in Example 1 except that in place of ferric chloride, aqueous solutions of ferric citrate, ferric lactate and ferric sulfate were added to whole sterilized cow's milk in amounts so that about 0.7 mg. of iron was added to each 100 ml. of milk. A control was also maintained as in Example 1.

In the control containing no added iron the green *Penicillium roqueforti* grew and sporulated poorly. In the other flasks containing about 0.7 mg. of iron per 100 ml. of milk in the forms listed above, the mold growth was good and sporulation was heavy.

The illustrative results given above have also been found to correspond with the results obtained in actual roquefort-type cheese manufacture. Where up to at least 7 p. p. m. of iron was added to the milk the green mold was found to grow very well and the resulting ripened cheese to be uniform and of the desired high quality.

The present application is a division of my above referred to copending application Serial No. 175,889, filed July 25, 1950, now Patent No. 2,665,990.

I claim:

1. In the process of preparing roquefort-type cheese from cow's milk employing colored blue-green *Penicillium roqueforti* mold, the improvement which consists in adding to the milk used in the production of the cheese sufficient iron to provide at least about 0.7 mg. to 1.5 mg. of iron in solution for about 100 ml. of milk.

2. In the process of preparing roquefort-type cheese from cow's milk employing colored blue-green *Penicillium roqueforti* mold, the improvement which consists in adding ferric chloride to the milk used in the production of the cheese, sufficient iron salt being added to provide at least about 7 p. p. m. of iron in solution in the milk.

3. In the process of preparing roquefort-type cheese from cow's milk employing colored blue-green *Penicillium roqueforti* mold, the improvement which consists in adding ferric sulfate to the milk used in the production of the cheese, sufficient iron salt being added to provide at least about 7 p. p. m. of iron in solution in the milk.

4. In the process of preparing roquefort-type cheese from cow's milk employing colored blue-green *Penicillium roqueforti* mold, the improvement which consists in adding ferric acetate to the milk used in the production of the cheese, sufficient iron salt being added to provide at least about 7 p. p. m. of iron in solution in the milk.

5. In the process of preparing roquefort-type cheese from cow's milk employing colored blue-green *Penicillium roqueforti* mold, the improvement which consists in adding ferric lactate to the milk used in the production of the cheese, sufficient iron salt being added to provide at least about 7 p. p. m. of iron in solution in the milk.

6. In the process of preparing roquefort-type cheese from cow's milk employing colored blue-green *Penicillium roqueforti* mold, the improvement which consists in adding ferric citrate to the milk used in the production of the cheese, sufficient iron salt being added to provide at least about 7 p. p. m. of iron in solution in the milk.

References Cited in the file of this patent

UNITED STATES PATENTS

| | | |
|---|---|---|
| 1,676,121 | Epstein | July 3, 1928 |
| 1,676,138 | Epstein | July 3, 1928 |

OTHER REFERENCES

Revised Bulletin 608, U. S. Dept. of Agr., issued Mar. 1918, "Scanno" Cheese, Revised Feb. 1932, pp. 42, 44, 45.

Bacteriology of Cheese III, Agricultural Experiment Station, Iowa State College of Agriculture and Mechanic Arts, Research Bulletin 237, August 1938, Ames, Iowa, page 206.

Heineman: Milk, W. G. Saunders Co., 1919, page 626.